United States Patent [19]

Hashimoto et al.

[11] Patent Number: 5,341,862
[45] Date of Patent: Aug. 30, 1994

[54] FLAME-RETARDANT RUBBER TIRES

[75] Inventors: Takatsugu Hashimoto; Keizo Akutagawa; Kazuo Yagawa, all of Kodaira; Makoto Tanaka, Higashimurayama; Junichi Yamagishi, Kodaira; Kazuo Hachiya, Kodaira, all of Japan

[73] Assignee: Bridgestone Corporation, Tokyo, Japan

[21] Appl. No.: 974,519

[22] Filed: Nov. 12, 1992

[30] Foreign Application Priority Data

| | | |
|---|---|---|
| Nov. 14, 1991 [JP] | Japan | 3-299017 |
| Nov. 15, 1991 [JP] | Japan | 3-300390 |
| Nov. 15, 1991 [JP] | Japan | 3-300606 |
| Jan. 29, 1992 [JP] | Japan | 4-013990 |
| Apr. 27, 1992 [JP] | Japan | 4-131409 |

[51] Int. Cl.$^5$ ............................. B60C 1/00
[52] U.S. Cl. ...................... 152/209 R; 152/525; 152/450
[58] Field of Search ............. 152/209 R, 525, 450

[56] References Cited

U.S. PATENT DOCUMENTS

| | | | |
|---|---|---|---|
| 4,373,046 | 2/1983 | Hagiwara et al. | 524/467 |
| 4,410,648 | 10/1983 | Kato et al. | 524/469 |
| 4,764,539 | 8/1988 | Ladang | 524/405 |
| 4,806,162 | 2/1989 | Ladang | 524/412 |

FOREIGN PATENT DOCUMENTS

| | | |
|---|---|---|
| 3816279 | 11/1988 | Fed. Rep. of Germany . |
| 4108895 | 9/1992 | Fed. Rep. of Germany . |
| 1-273703 | 11/1989 | Japan ............ 152/525 |

OTHER PUBLICATIONS

European Search Report dated Mar. 4, 1993.
Database WPIL, Week 8950, Derwent Publications Ltd., London, GB; AN 89-366893 & JP-A-1 273 703 (The Yokohama Rubber Co. Ltd) Nov. 1 1989.
Database WPIL, Week 8623, Derwent Publications Ltd., London, GB; AN 86-147819 & JP-A-61 083 242 (The Yokohama Rubber Co. Ltd.) Apr. 26 1986.
Database WPIL, Week 8605, Derwent Publications Ltd., London, GB AN 86032012 & JP-A-60 252 646 (Showa Elec Wire KK.) Dec. 13 1985.

*Primary Examiner*—Michael W. Ball
*Assistant Examiner*—Nancy T. Krawczyk
*Attorney, Agent, or Firm*—Sughrue, Mion, Zinn, Macpeak & Seas

[57] ABSTRACT

In a flame-retardant rubber tire comprising an outer rubber body portion consisting essentially of a tread rubber layer, a sidewall rubber layer extending inward from each side edge of the tread rubber layer toward the vicinity of a bead portion in radial direction and a rubber chafer layer arranged in the vicinity of the bead portion, a flame-retardant rubber composition having an oxygen index of not less than 19.8 but not more than 27.5 is disposed so as to amount at least 20% by weight of the tread rubber layer. Such rubber tires are used in electric vehicles, automobiles, airplanes and the like and have excellent self-extinguishing property and flame-delaying property without damaging other rubber properties.

2 Claims, 10 Drawing Sheets

FIG_1
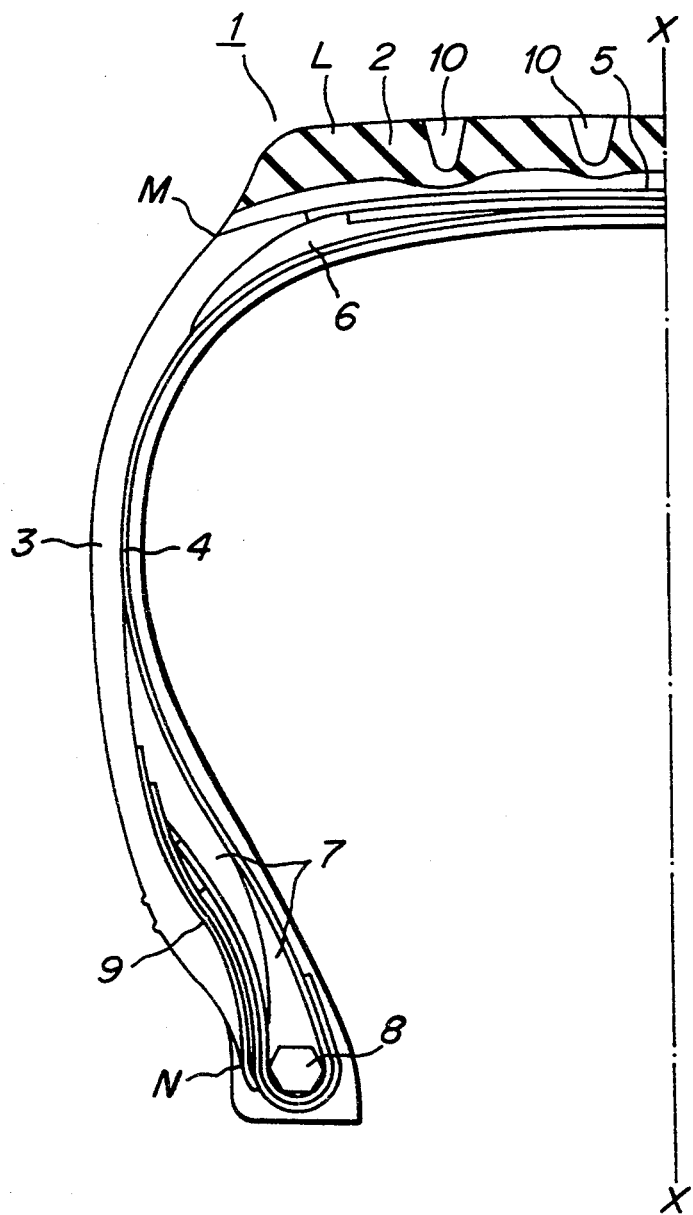

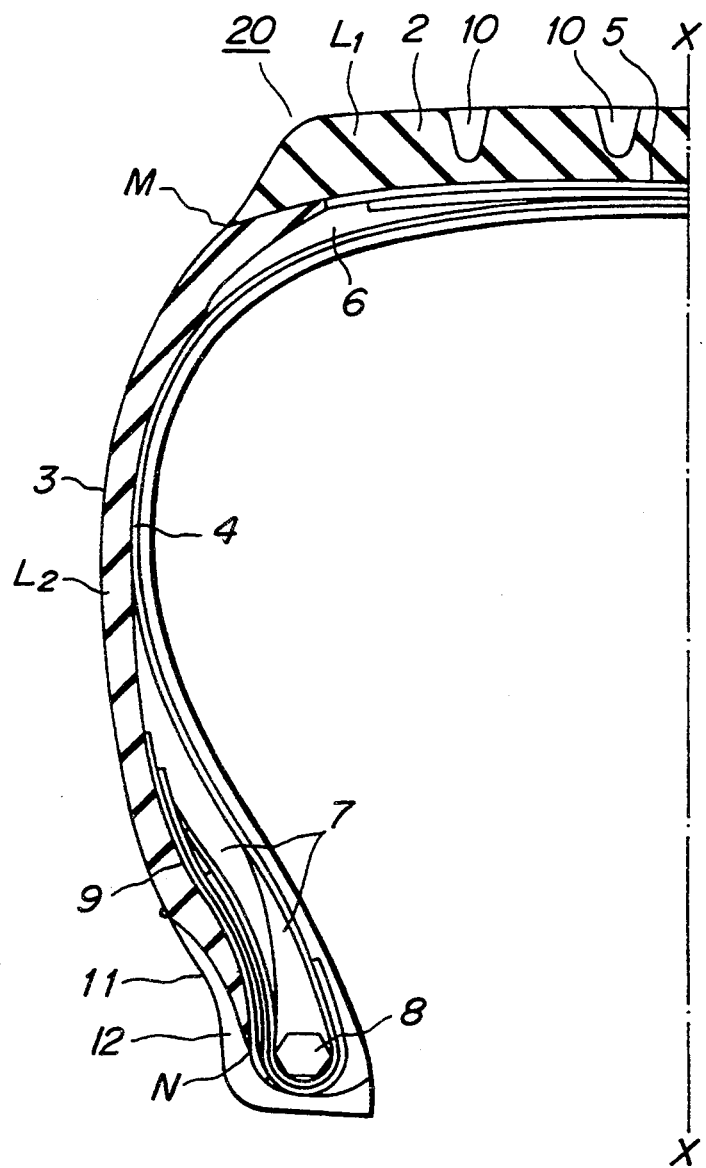
FIG_2

FIG_3
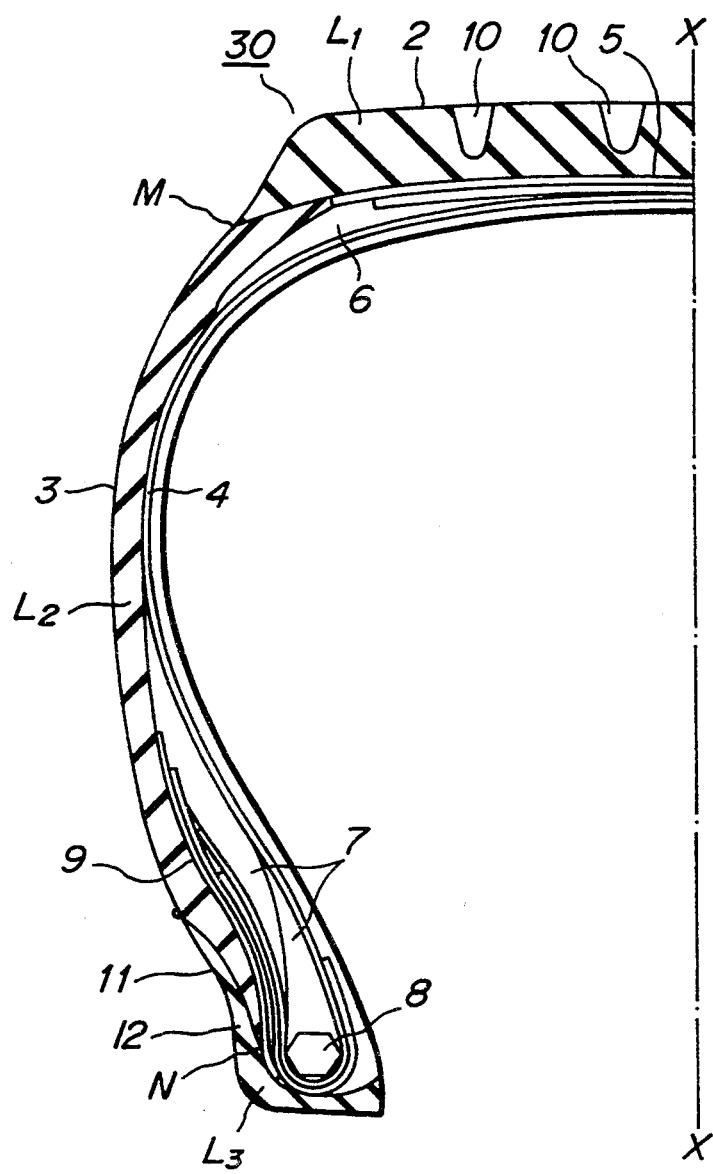

FIG._4
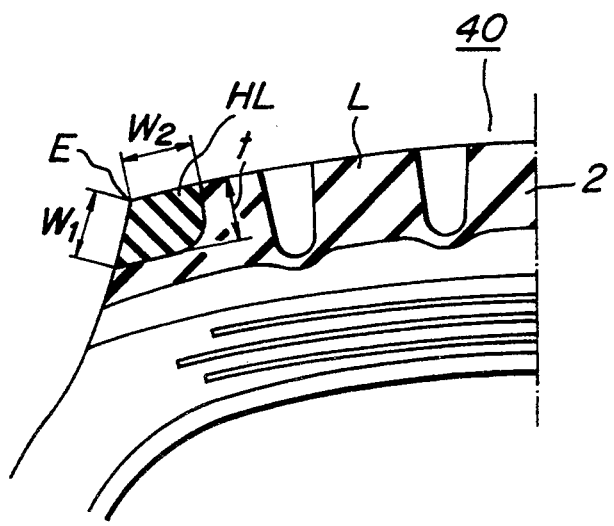
FIG._5
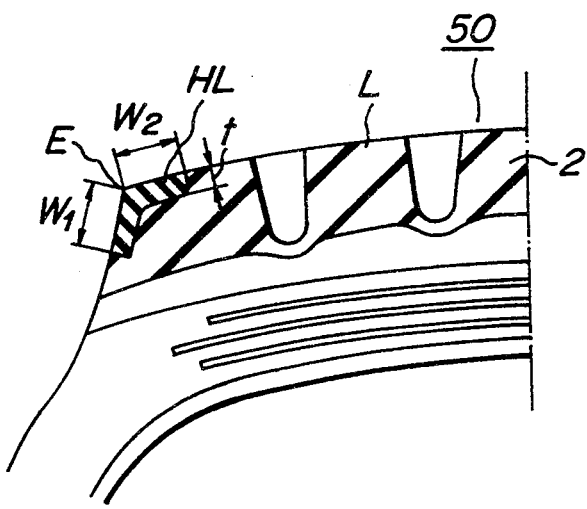

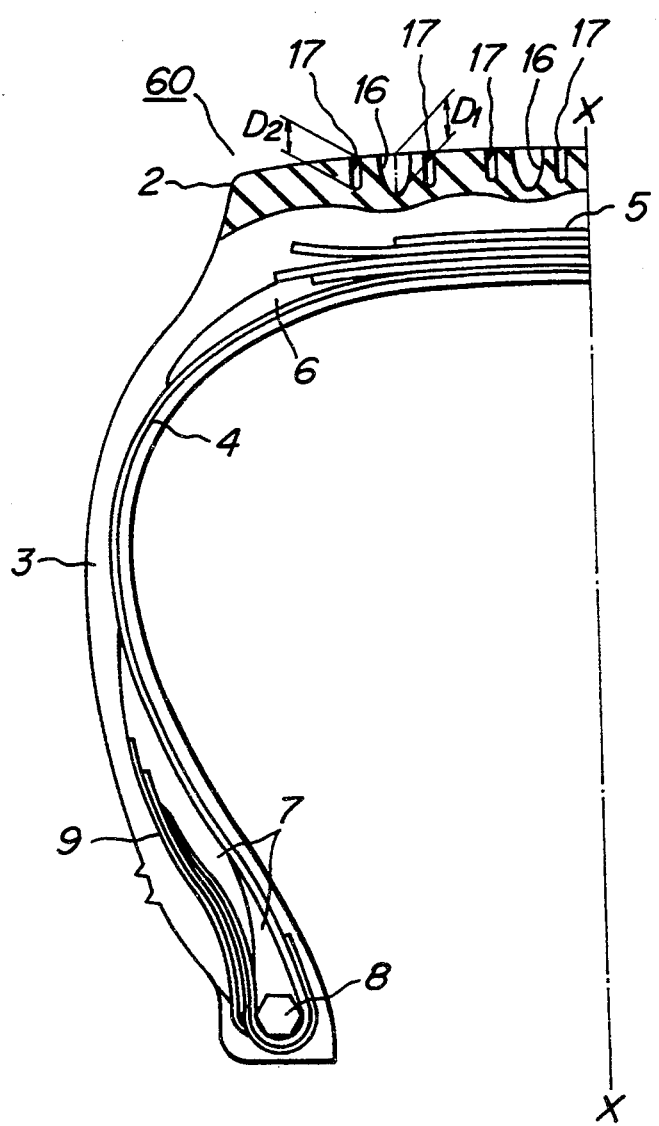
FIG_6

FIG_7
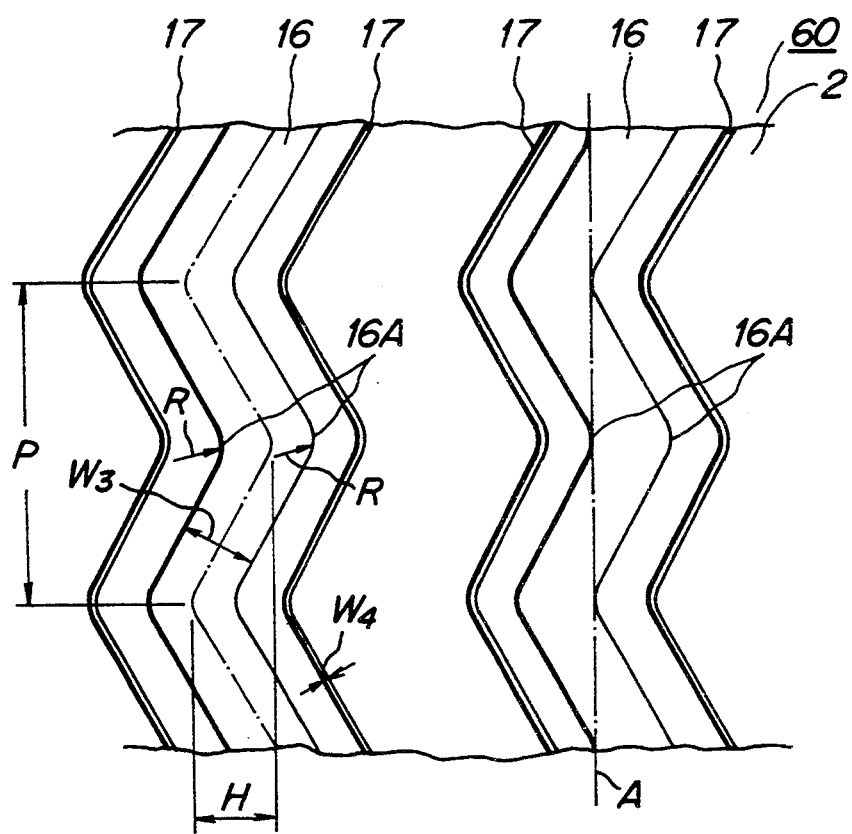

FIG_8
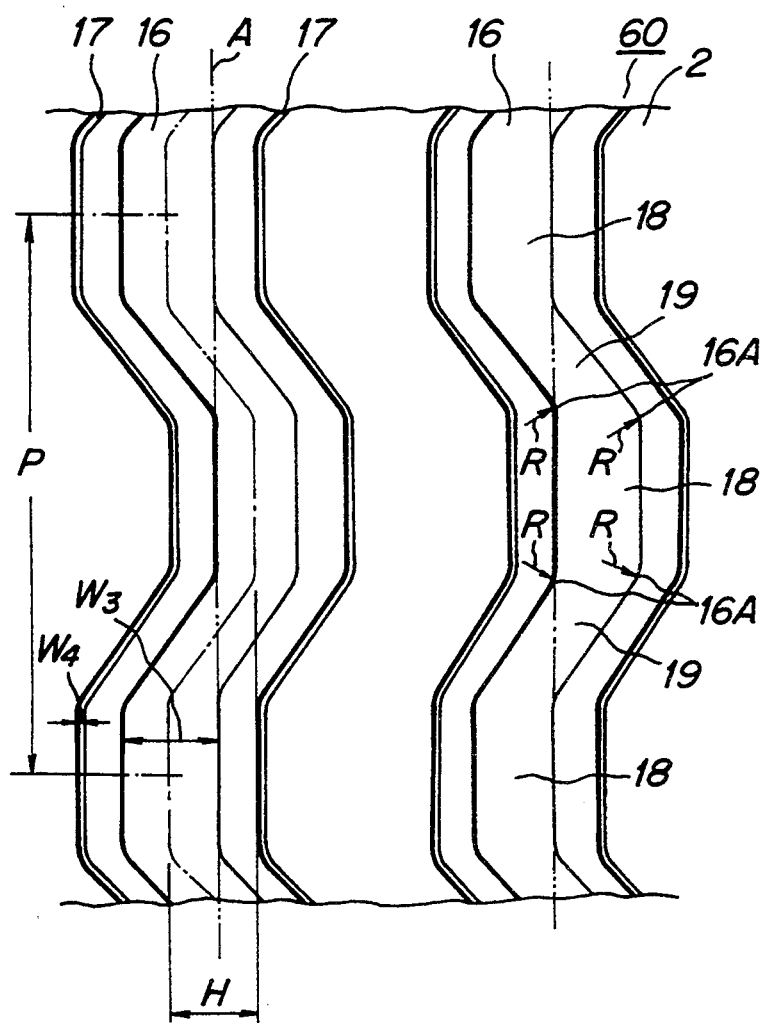

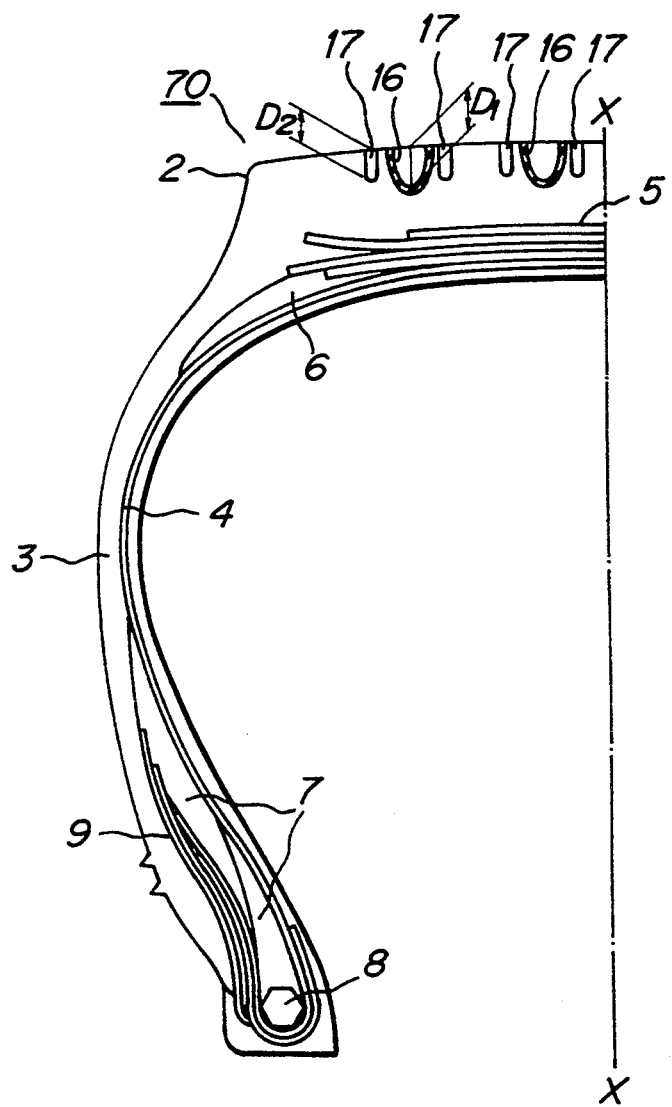

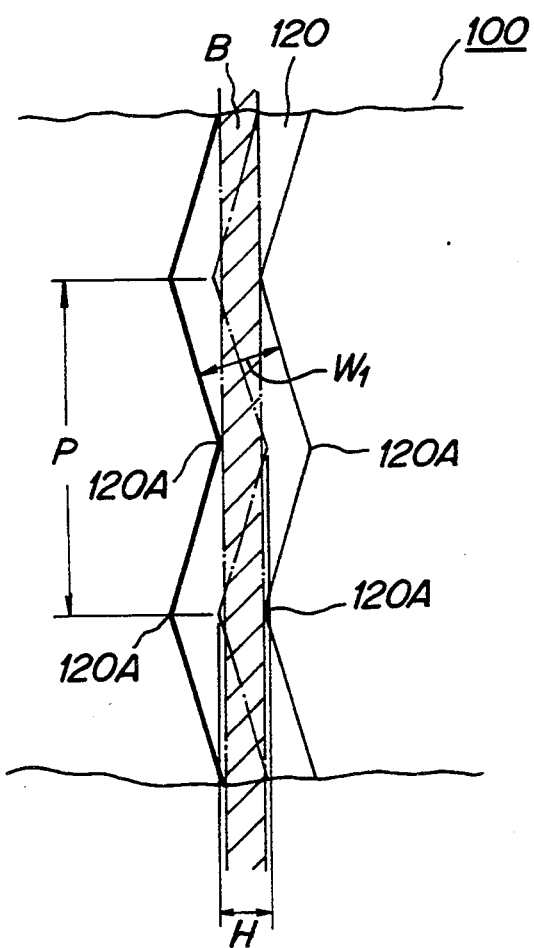
FIG_10

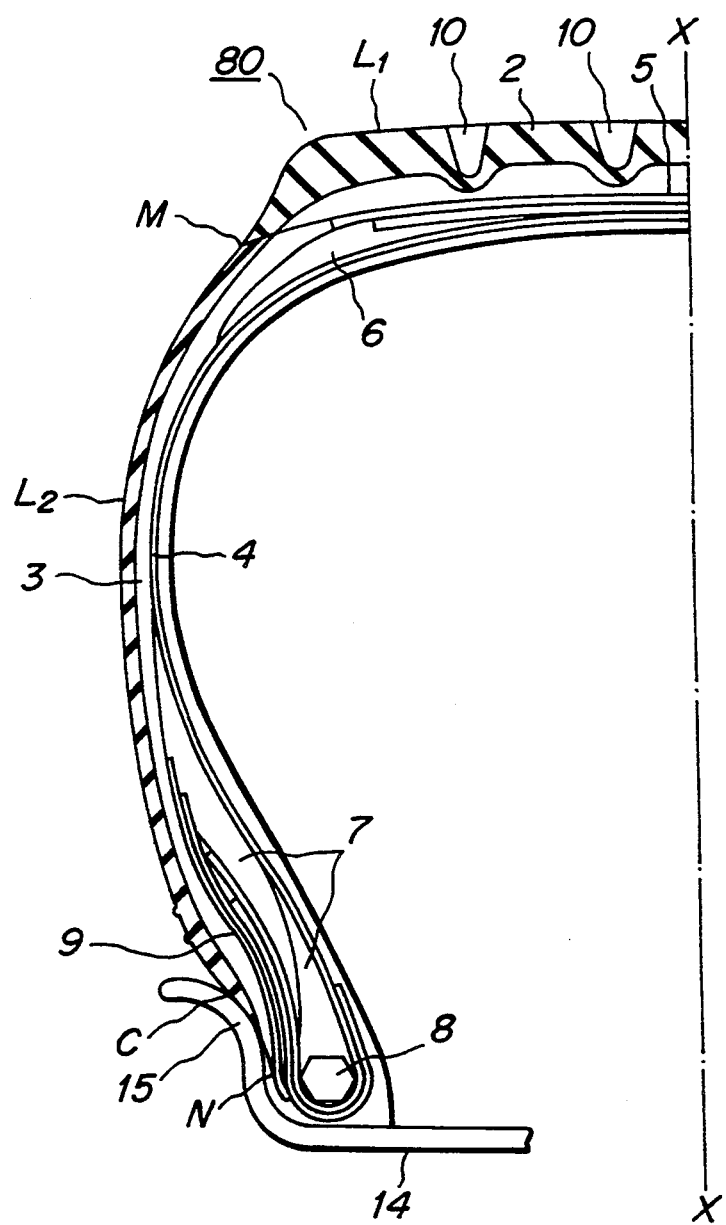
FIG_11

FLAME-RETARDANT RUBBER TIRES

BACKGROUND OF THE INVENTION

1. Field of the Invention

This invention relates to rubber tires for use in subways, monorails, electric vehicles for a new transportation system, airplanes, automobiles, construction vehicles, industrial vehicles and the like, more particularly, it relates to a rubber tire having good flame retardance and safeness while maintaining various rubber properties such as wear resistance, resistance to heat separation, crack resistance and the like.

2. Description of the Related Art

In general, rubber tires have a property of easily burning when the tire is exposed to a high-temperature flame or sparked by short-circuit at high voltage and current. Further, there is a risk that once the tire is ignited and rendered into a burning state, the fire cannot easily be extinguished but also, that spreading is promoted due to high burning temperature. Further, poisonous gas containing carbon is produced.

In case of the electric vehicle provided with rubber tires for transporting a great number of persons, the burning of these tires endangers human life. Particularly, it becomes more serious in case of the subway vehicles because these vehicles are run in a closed space.

In case of an emergency state where it is particularly obliged to apply severer braking force to the rubber tires in the landing of the airplane, there is a risk that the tread portion locally raises temperature and finally ignites. On the other hand, when flammable and explosive hazardous materials are transported by automobiles, there may be caused a risk that the temperature of the rubber tire becomes abnormally high and finally the ignition is caused. Therefore, it is strongly demanded to develop non-ignitable and flame-retardant rubber tires.

In this connection, Japanese patent laid open No. 1-273703 proposes a flame-retardant rubber tire in which a flame-retardant rubber layer of 0.3–3.0 mm in thickness is formed on a rubber surface of at least one sidewall portion. This tire is particularly used in a monorail or the like, wherein the flame-retardant rubber layer formed in the sidewall portion of the tire is located in the vicinity of contact brushes of an electric motor generating electric spark.

In the discussion on the burning of the rubber tire used in the electric vehicle, it should be noted that an electric current is grounded onto a railway through a tread surface of the tire contacting therewith in the leakage of electricity. Since a large current is generally used in the vehicle, a violent sparking phenomenon is created between the tread and the railway together with an explosion sound. Even when such a sparking is a very short time, there occurs over a risk that the tread of the rubber tire is ignited to cause the firing or burning of the tire. In order to avoid such a risk, it has been attempted to extremely increase the electric resistance of the rubber tire to, for example, several to several tens MΩ for a while, but some problems such as risk of electric shock to human body, bad influence upon other parts and the like are posed. Therefore, it is considered that the existing rubber tires having a low electric resistance are suitable. Moreover, these facts are not considered at all in the aforementioned conventional technique that the flame-retardant rubber layer is formed only in the sidewall portion of the rubber tire.

Further, it is clear that the above problems are existent even in the rubber tires for airplane and automobiles. In the rubber tire for automobiles, it is considered that the tread may ignite by some causes, for example, a cause that separation failure is caused in the belt of plural steel cord layers for the reinforcement of the tread to rub the steel cords with each other to thereby raise the temperature and form cracks in the tread. Therefore, the conventional technique for the formation of the flame-retardant rubber layer in the sidewall portion is incomplete and impractical against not only the ignition from the inside of the tire but also the exposure to high-temperature flame from outside.

According to the inventors' experiments, it has been confirmed that even when flame is locally applied to the sidewall portion of the flame-retardant rubber layer, the rubber tire easily ignites and burns according to the weight and gauge of the flame-retardant rubber layer dependent upon heat capacity of fire source. In this connection, the above conventional technique has a problem in practical use.

Since the wear resistance, resistance to heat generation, separation resistance and the like are preferentially considered as a most fundamental and important property of the rubber tire and there is a fear of largely damaging these properties with the use of the flame-retardant rubber composition in the tread, it is considered that there is no technique for the formation of flame-retardant rubber tires capable of coping with various environmental conditions promoting such burning.

SUMMARY OF THE INVENTION

It is, therefore, an object of the invention to solve the aforementioned problems and to provide a flame-retardant rubber tire having efficient ignition-delaying property and self-extinguishing property while controlling an amount of a flame retardant used to a minimum without damaging fundamental properties required in the rubber tire such as wear resistance, resistance to heat generation, separation resistance, crack resistance and the like.

According to a first aspect of the invention, there is the provision of a flame-retardant rubber tire comprising an outer rubber body portion consisting essentially of a tread rubber layer, a sidewall rubber layer extending inward from each side edge of the tread rubber layer toward the vicinity of a bead portion in radial direction and a rubber chafer layer arranged in the vicinity of the bead portion, and a reinforcing body located inside the outer rubber body portion, in which a flame-retardant rubber composition having an oxygen index of not less than 19.8 but not more than 27.5 is disposed in the outer rubber body portion so as to amount at least 20% by weight of the tread rubber layer.

In a preferable embodiment of the invention, the flame-retardant rubber composition having an oxygen index of 19.8–25.0 is disposed in the rubber body portion to amount at least 40% by weight of the rubber body portion.

In another preferable embodiment of the invention, a flame-retardant rubber composition having an oxygen index of not less than 25.0 is disposed in a shoulder portion including a tread end.

In the other preferable embodiment of the invention, at least outer surface portion of a circumferential groove formed in the tread rubber layer is formed with a flame-retardant rubber composition having an oxygen index of 19.8–27.5 and a space of the circumferential groove extends zigzag in the circumferential direction of the tire so as not to have a straight see-through portion.

According to a second aspect of the invention, there is the provision of a flame-retardant rubber tire comprising an outer rubber body portion consisting essentially of a tread rubber layer, a sidewall rubber layer extending inward from each side edge of the tread rubber layer toward the vicinity of a bead portion in radial direction and a rubber chafer layer arranged in the vicinity of the bead portion, and a reinforcing body located inside the outer rubber body portion, in which at least a part of the outer rubber body portion is comprised of one or more flame-retardant rubber layers having an oxygen index (O.I.) of not less than 19.8, and an absolute value of total (O.I.) $\times S \times V \times U$ values of the flame-retardant rubber layers is not less than 10 as a flame retardance when S is a ratio of surface area of the flame-retardant rubber layer to full surface area of the outer rubber body portion, V (kg) is a weight of the flame-retardant rubber layer and U is a ratio of weight (kg) of the flame-retardant rubber layer to total weight (kg) of the outer rubber body portion.

BRIEF DESCRIPTION OF THE DRAWINGS

The invention will be described with reference to the accompanying drawings, wherein:

FIG. 1 is a left-half radial section view of a first embodiment of the flame-retardant rubber tire according to the invention;

FIGS. 2 and 3 are left-half radial section views of another embodiments of the flame-retardant rubber tire according to the invention, respectively;

FIGS. 4 and 5 are partly enlarged section views of the other embodiments of the flame-retardant rubber tire according to the invention;

FIG. 6 is a left-half radial section view of the other embodiment of the flame-retardant rubber tire according to the invention;

FIGS. 7 and 8 are plan views of various embodiments of the tread in the tire of FIG. 6, respectively;

FIG. 9 is a left-half radial section view of a still further embodiment of the flame-retardant rubber tire according to the invention;

FIG. 10 is a partial plan view of a tread pattern in the other rubber tire; and

FIG. 11 is a left-half radial section view of the still further embodiment of the flame-retardant rubber tire according to the invention.

DESCRIPTION OF THE PREFERRED EMBODIMENTS

In FIG. 1 is shown a left-half radial section with respect to an equator X—X in a first embodiment of the flame-retardant rubber tire according to the invention. This tire 1 comprises an outer rubber body portion consisting essentially of a tread rubber layer 2, a sidewall rubber layer 3 extending inward from each side edge M of the tread rubber layer 2 toward the vicinity of a bead core 8 in radial direction and a rubber chafer adjacent to the sidewall rubber layer in the bead portion. Moreover, N is an inward side edge of the sidewall rubber layer in the radial direction.

Inside the outer rubber body portion is arranged a reinforcing body comprising a pair of bead cores 8, a carcass 4 toroidally extending between the bead cores and wound around the bead core from inside toward outside, a belt 5 superimposed about a crown portion of the carcass, a cushion rubber 6 disposed adjacent to the side edge of the belt, rubber stiffener 7 sandwiched between the carcass and its turnup portion and extending outward in the radial direction and a bead reinforcing layer 9. Moreover, numeral 10 is a circumferential groove formed in the tread rubber layer 2.

In the invention, a layer of a flame-retardant rubber composition is formed as a tread rubber layer 2 in an amount corresponding to at least 20% by weight of the tread rubber layer as shown by shadowed portion L in FIG. 1. Moreover, the remaining tread rubber layer and the sidewall rubber layer are composed of a rubber composition usually used in the rubber tire. Thus, the amount of a flame retardant used can be controlled to a minimum. That is, at least a part of the tread rubber layer is formed by the flame-retardant rubber layer L to cope with various factors for the firing of the tire such as exposure of high temperature flame from exterior, self-ignition from the interior of the tire, variety of fire sources, heat capacity of fire source and the like. In this case, the flame-retardant rubber composition has an oxygen index of not less than 19.8 but not more than 27.5, preferably 20.2–25.0, more particularly 20.4–24.5. Moreover, the oxygen index is determined according to JIS K7201.

In FIGS. 2 and 3 are shown second and third embodiments of the flame-retardant rubber tire according to the invention, respectively, in which numeral 11 is a bead portion and numeral 12 is a rubber chafer adjacent to the sidewall rubber layer in the bead portion. According to the invention, at least 40% by weight of the outer rubber body portion in these tires 20 and 30 is replaced with a layer of a flame-retardant rubber composition having an oxygen index of 19.8–27.5. For instance, in the tire 20 of FIG. 2, the whole of the tread rubber layer 2 is the flame-retardant rubber layer $L_1$ and the whole of the sidewall rubber layer 3 is the flame-retardant rubber layer $L_2$. In tire 30, the rubber chafer 12 is comprised of the flame-retardant rubber layer $L_3$ in addition to the layers $L_1$ and $L_2$ as shown in FIG. 3.

In the flame-retardant rubber composition according to the invention, natural rubber, styrenebutadiene copolymer rubber, polybutadiene rubber, acrylonitrile-butadiene copolymer rubber, ethylene-propylene -conjugated diene terpolymer rubber, butyl rubber, halogenated butyl rubber, fluorine rubber, epichlorohydrine rubber and the like may be used as a rubber ingredient. Among them, it is preferable to use natural rubber, styrene-butadiene copolymer rubber, polybutadiene rubber, acrylonitrile-butadiene copolymer rubber, ethylene-propylene-conjugated diene terpolymer rubber, butyl rubber and halogenated butyl rubber alone or in admixture in view of various properties of the rubber tire.

The flame-retardant rubber composition is prepared by compounding such rubber ingredient with additives and a flame retardant as mentioned later.

As the additive, use may be made of all additives usually used in the conventional rubber tire such as carbon black, filler, softening agent, vulcanizing agent, vulcanization accelerator, antioxidant and the like.

As the flame retardant, use may be made of chlorinated paraffin, antimony trioxide, aluminum hydroxide, magnesium hydroxide, hexabromobenzene, tetrabromobisphenol-A, triphenyl phosphate, tricresyl phosphate, red phosphorus and the like. Among them, at least one of chlorinated paraffin, antimony trioxide, aluminum hydroxide, magnesium hydroxide and red phosphorus is preferably used as the flame retardant from a viewpoint of high flame-retarding effect and compatibility with rubber.

The inventors have made various experiments in order to establish the flame-retardant rubber tire against various fire sources and found that the flame-retardant rubber tire is largely dependent upon the amount of the flame-retardant rubber composition used and the position used in the tire in addition to the flame-retarding degree of the flame-retardant rubber composition used in the outer rubber body portion as mentioned later.

That is, the inventors have made the combustion experiment on a specimen composed of only the conventional flame-retardant rubber composition and confirmed that this specimen shows the flame retardance. However, when the combustion experiment, assuming the actual firing is made by forming the layer of the above flame-retardant rubber composition having a thickness of 3 mm onto the surface of the sidewall portion (total thickness: 7 mm), the tire burns at about 690° C. and the flame retardance is hardly recognized and hence it is concluded that the amount of the conventional flame-retardant rubber composition used in the sidewall portion is insufficient. Further, it has been confirmed that according to the combustion experiment, on the conventional rubber tire using the relatively flammable rubber composition having an oxygen index of 19.2, if the volume (weight) of the rubber composition occupied in the outer rubber body portion is sufficiently large to the heat capacity of fire source, the flame retardance is developed as a rubber tire.

According to analytical results of the above experiments, it can not be said that the flame-retardant rubber tire is obtained only by forming the flame-retardant rubber layer in the outer rubber body portion. In other words, it is suggested from the above analytical results that the object of the invention is attained when the weight (volume) of the flame-retardant rubber layer occupied in the outer rubber body portion against the heat capacity of fire source is ensured at minimum and the flame-retardant rubber layer is formed only at a position having a highest burning degree and the conventional rubber composition having a relatively high flammability is applied to the other remaining portion.

Thus, the inventors have concluded that in order to provide a flame-retardant rubber tire capable of sufficiently coping with actual fire, ignition source, heat capacity of fire source such as high voltage and large current spark, position of fire course and the like, it is required to apply the flame-retardant rubber composition to the tread rubber layer having a highest burning degree and restrict the weight ratio of the flame-retardant rubber layer to the full tread rubber layer and the oxygen index of the flame-retardant rubber layer to optimum ranges, respectively.

In this connection, the reason why at least 20% by weight of the tread rubber layer is replaced with the layer of the flame-retardant rubber composition is due to the fact that the fire source actually burning the rubber tire frequently concentrates in the tread rubber layer. Moreover, when the heat capacity of the fire source is large and cannot cope with only the flame-retardant tread rubber layer, there is a risk of igniting and burning the rubber layer other than the flame-retardant rubber layer. In the latter case, it is preferable that at least 40% by weight of the outer rubber body portion is replaced with the layer of the flame-retardant rubber composition, whereby the sufficient flame retardance can be developed.

When the oxygen index of the flame-retardant rubber composition is less than 19.8, the sufficient flame retardance as a rubber tire is not obtained under the aforementioned high temperature environmental conditions. When it exceeds 27.5, sufficient dynamic properties required in the rubber tire such as tensile strength, resistance to crack growth, rebound resilience and the like are not obtained and hence the properties of the rubber tire such as wear resistance, crack resistance, low heat build-up, cut resistance and the like largely lower.

The reason why chlorinated paraffin, antimony trioxide, aluminum hydroxide, magnesium hydroxide and red phosphorus are selected as a flame retardant preferably used in the flame-retardant rubber composition is due to the fact that these flame retardants are good in the compatibility with rubber and less in the influence upon physical rubber properties such as wear resistance, cut resistance and the like. Further, such a flame retardant provides a more favorable flame-retarding effect. That is, when the flame-retardant rubber layer containing such a flame retardant is exposed to a combustion temperature of from about 650° C. to 1200° C., there is obtained a composite effect by the generation of flame-retardant gas for dilution of oxygen in air, the endothermic reaction through discharge of crystal water, the shut-off of oxygen through the formation of polyphosphoric acid film, the formation of carbide layer and the like.

Furthermore, it has been confirmed that the flame retardance of the tire is largely dependent upon the shape in addition to the oxygen index. For example, when comparing column, square pillar and trigonal prism at the same sectional area, the burning rate is an order of trigonal prism>square pillar>column. This means that the burning rate is related to an angle in a corner and the smaller the angle, the larger the burning rate, from which it is suggested that it is effective to mainly flame-retard a corner portion of the tire such as shoulder portion or the like. Therefore, a higher flame-retardant rubber layer is arranged in the shoulder portion inclusive of tread end, whereby the igniting and spreading rates at the corner of the shoulder portion can be delayed to provide a higher flame retardance.

According to the invention, therefore, at least a cap rubber of the tread is formed by a flame-retardant rubber composition having an oxygen index of 19.8–27.5, while the shoulder portion is formed by a higher flame-retardant rubber having an oxygen index of not less than 25.0.

The size of the higher flame-retardant rubber layer formed in the shoulder portion is dependent upon the size of the tire, but is preferable that the surface distances of the higher flame-retardant rubber layer HL from a tread end E inward in the radial direction and in the axial direction ($W_1$, $W_2$) are within a range of 4.0–20 mm, respectively, as shown in FIGS. 4 and 5 in case of the tires having a usual tire size. When the surface distance is less than 4.0 mm, the delay of the igniting and spreading rates in the corner of the shoulder portion is insufficient. When it exceeds 20 mm, the properties such as resistance to uneven wear and the like are undesirably degraded. Furthermore, the thickness (t) of the higher flame-retardant rubber layer HL toward inside of the rubber is favorable to be within a range of 2–6 mm. When the thickness t is less than 2 mm, the delay of the igniting and spreading rates in the corner of the shoulder portion is insufficient. When it exceeds 6 mm, the properties such as resistance to uneven wear and the like are undesirably degraded.

As a result of further experiments, it has been confirmed that the igniting and spreading rates of the tire increase in accordance with the shape of the tread pattern, i.e. the zigzag shape of the main circumferential groove formed in the tread. That is, it has been confirmed from various experiments that the groove portion developing a chimney effect is first ignited, and spreading becomes faster as a see-through portion straightly extending in the circumferential direction of the groove space (shadowed region B in FIG. 10) becomes large, or the ignition and it spreading proceeds as the corner portion in the groove wall becomes sharp.

According to the invention, when the flame-retardant rubber layer is formed in the tread portion, it is preferable that at least an outer surface portion of a circumferential groove formed in the tread rubber layer is formed with a flame-retardant rubber composition having an oxygen index of 19.8-27.5 and a space of the circumferential groove extends zigzag in the circumferential direction of the tire so as not to have straight see-through portion (see FIGS. 7 and 8). In this case, since the main circumferential groove has no straight see-through portion, the amplitude of zigzag is large and the see-through portion is interrupted by the bent portion of zigzag. Hence the chimney effect is controlled, which can effectively prevent the spreading of fire together with the flame-retardant rubber layer.

Furthermore, the groove sidewalls at the bent portion of the circumferential groove are smoothly connected to each other at a radius of curvature of not less than 5 mm in the corner of the bent portion, whereby the flammable sharp corner is eliminated to provide a higher flame retardance.

Moreover, at least a tread portion located at the shoulder side is provided with a fine groove located in the vicinity of the main circumferential groove and extending substantially in parallel thereto (FIGS. 6 to 9). As a result the occurrence of river wear created along the main circumferential groove by lateral force is effectively prevented. Preferably, the fine groove is arranged at each side of the main circumferential groove.

In the fine groove, the distance from the main circumferential groove is preferably within a range of 3-7 mm, and the width of the fine groove is preferably within a range of 0.5-2 mm. When the distance of the fine groove from the main circumferential groove is less than 3 mm, if the lateral force is applied over the fine groove, the progress of river wear cannot effectively be prevented. When it exceeds 7 mm, there is a fear of creating uneven wear over a wide region. On the other hand, when the width of the fine groove is less than 0.5 mm, there is a fear of promoting wear over the fine groove, while when it exceeds 2 mm, there is a fear of acting the fine groove as a nucleus for the occurrence of uneven wear.

Although the fine groove is reduced in the chimney effect, the sidewall and bottom portions of the fine groove are preferably formed by the flame-retardant rubber layer like the main circumferential groove in order to give a more flame retardance to the tire.

According to the invention, when at least a part of the outer rubber body portion is comprised of one or more flame-retardant rubber layers having an oxygen index (O.I.) of not less than 19.8, it is preferable to satisfy that an absolute value of total (O.I.) $\times S \times V \times U$ values of the flame-retardant rubber layers is not less than 10 as a flame retardance when: S is a ratio of surface area of the flame-retardant rubber layer to the full surface area of the outer rubber body portion, V (kg) is a weight of the flame-retardant rubber layer and U is a ratio of weight (kg) of the flame-retardant rubber layer to total weight (kg) of the outer rubber body portion. In this case, it is desirable that the surface area ratio S is at least 0.30 and the weight ratio U is not less than 0.40.

In FIG. 11 is shown a tire 80 according to the invention. Moreover, numeral 14 is a standard rim for mounting the tire 80, and numeral 15 a flange of the rim 14, and letter C a contact position between the sidewall rubber layer 3 and the rim flange 15 in the inflation of the tire under standard air pressure.

In the tire of FIG. 11, when the oxygen indexes of the flame-retardant rubber layers $L_1$ and $L_2$ are $(O.I.)_1$ and $(O.I.)_2$, the ratio of surface areas of the layers $L_1$ and $L_2$ to the total surface area of the outer rubber body portion are $S_1$ and $S_2$, the weights of the layers $L_1$ and $L_2$ are $V_1$ and $V_2$ (kg), and the ratios of the weights $V_1$ and $V_2$ to the total weight (kg) of the outer rubber body portion are $U_1$ and $U_2$, an absolute value of sum of $(O.I.)_1 \times S_1 \times V_1 \times U_1$ and $(O.I.)_2 \times S_2 \times V_2 \times U_2$ is a value indicating a flame retardance of the rubber tire according to the invention.

The inventors have found that when each of the factors (O.I.), S, V and U is randomly applied to the outer rubber body portion of the rubber tire, sufficient flame retardance and tire performances are not always obtained. However, when product of these factors, i.e. (O.I.) $\times S \times V \times U$ is a given value or more, the flame retardance and tire performances can simultaneously be established. Further, it has been confirmed that when the same flame-retardant rubber composition is applied to different positions of the outer rubber body portion, the flame retardance is critical in accordance with the use condition of the rubber tire, but when different flame-retardant rubber compositions are applied to given positions of the outer rubber body portion as shown in FIG. 11, the resulting tire can cope with all use conditions promoting the burning of the tire.

The reason why the flame retardance of the flame-retardant rubber layers is limited to not less than 10 is due to the fact that when it is less than 10, the flame retardance as the rubber tire is insufficient when the heat capacity of the fire source exceeds a certain level. In the invention, the value of flame retardance is preferably 13-2750, and more particularly 15-1000. Moreover, when the flame retardance exceeds 2750, there is a fear of promoting the wear of the tread and considerably degrading the resistance to heat separation, crack resistance and the like.

The reason why the total ratio S of flame-retardant rubber layers is not less than 0.30 is due to the fact that when it is less than 0.3, the outer rubber body portion other than the flame-retardant rubber layer burns out if the heat capacity of fire source is large. Further, the reason why the total weight ratio U of the flame-retardant rubber layers is not less than 0.40 is due to the fact that when it is less than 0.4, the burning of the tire continues if the heat capacity of fire source is large. In the relation between S and U, when one of S and U is extremely smaller than the other, the balance is not maintained and finally the burning is caused.

The following examples are given in illustration of the invention and are not intended as limitations thereof.

EXAMPLES 1 AND 2

In these examples, there are provided flame-retardant rubber tires having a tire size of 13/80R20 and a basic structure as shown in FIG. 1. Moreover, the reinforcing portion inside the outer rubber body portion is same in the tires of the examples, control and comparative example.

That is, the reinforcing portion comprises a radial carcass 4 comprised of single steel cord ply toroidally extending between a pair of bead cores 8, a belt 5 composed of two steel cord layers located outside the radial carcass in the radial direction, a cushion rubber 6 located inside each side end portion of the belt in the radial direction, a stiffener rubber 7 between the radial carcass and its turnup portion, and a bead reinforcing layer 9 located along the outside of the turnup portion of the radial carcass 4.

In the rubber tire of Example 1, the outer rubber body portion comprises the tread rubber layer 2 and the sidewall rubber layer 3, in which 85% by weight of the tread rubber layer 2 is a flame-retardant rubber layer L and the remaining tread rubber layer and the sidewall rubber layer is formed by an ordinary rubber composition. The weight of the layer L is 14.5 kg, and the total weight of the tread rubber layer is 17 kg, while the weight of the sidewall rubber layer is 4 kg. Incidentally, the weight of the rubber tire 1 is 65 kg.

In the rubber tire of Example 2, the tread rubber layer 2 is the same as in Example 1 except that the compounding recipe of the flame-retardant rubber layer L is different from that of Example 1.

In the rubber tire of Comparative Example 1, only the outer surface portion of the sidewall rubber layer 3 is formed by 3.5 kg of a flame-retardant rubber composition.

A compounding recipe of rubber layers used in Examples 1 and 2 and the control and Comparative Example 1 is shown in Table 1. In this case, the numerical value of the additive is represented as part by weight based on 100 parts parts by weight of rubber ingredient according to usual manner. In Table 2 are shown compounding recipe No. applied to the outer rubber body portion and its oxygen index every flame-retardant rubber composition and ordinary rubber composition. Moreover, the wear resistance and crack resistance of specimen (corresponding to the outer portion of the tread) in Table 2 are represented by an index of data measured in laboratory, in which the larger the index value, the better the property.

Each of the above rubber tires was mounted onto a standard rim of 8.50V-20, inflated under a standard air pressure to sufficiently fix to the rim, deflated to atmospheric pressure. Then, the flame retardance of the tire at a horizontally held state is evaluated by a burning test such that the tread was heated by means of a butane gas burner, a nozzle of which is positioned at a distance of about 5 cm apart from a lower face of the tread, at a flame temperature of about 1000° C. under conditions that height, width and thickness of the flame are about 10 cm×10 cm×1 cm for 15 minutes.

The results of such a burning test are also shown in Table 2. The rubber tires of Examples 1 and 2 exhibit excellent flame retardance because they ignite after about 0.5 minute but the burning is extinguished immediately or in about 3 minutes after the stop of the heating. On the other hand, the rubber tires in the control and Comparative Example 1 are burnt out after termination of heating.

Furthermore, the wear resistance and crack resistance of the rubber tire are evaluated by actually running the vehicle, and also the heat build-up and separation resistance are evaluated by running on a drum testing machine for a given time. The results are also shown in Table 2. The wear resistance is represented by an index on the basis that the control is 100, in which the larger the index value, the better the property. On the other hand, the durability totally evaluates the properties other than the wear resistance. The rubber tires of these examples are equal to or practically ignorable as compared with the control.

TABLE 1

|  | Tread rubber layer | | | Sidewall rubber layer | |
| --- | --- | --- | --- | --- | --- |
|  | Compounding recipe No. | | | | |
|  | 1 | 2 | 3 | 4 | 5 |
| natural rubber | 70.0 | 70.0 | 70.0 | 50.0 | 50.0 |
| polybutadiene rubber | 30.0 | 30.0 | 30.0 | 50.0 | 50.0 |
| carbon black | 45.0 | 45.0 | 45.0 | 40.0 | 40.0 |
| stearic acid | 2.0 | 2.0 | 2.0 | 2.0 | 2.0 |
| zinc white | 4.0 | 4.0 | 4.0 | 3.0 | 3.0 |
| sulfur | 1.5 | 1.5 | 1.5 | 2.0 | 2.0 |
| vulcanization accelerator | 0.85 | 0.85 | 0.85 | 0.5 | 0.5 |
| antioxidant | 1.4 | 1.4 | 1.4 | 1.6 | 1.6 |
| chlorinated paraffin | 0.0 | 6.0 | 18.0 | 0.0 | 19.0 |
| antimony trioxide | 0.0 | 0.9 | 2.7 | 0.0 | 2.9 |
| aluminum hydroxide | 0.0 | 4.5 | 13.5 | 0.0 | 14.5 |
| oxygen index | 19.2 | 21.5 | 23.5 | 19.2 | 23.5 |

Note) Enpara 70 (trade name) used as a chlorinated paraffin

TABLE 2

|  | Example 1 | Example 2 | Control | Comparative Example 1 |
| --- | --- | --- | --- | --- |
| Flame-retardant rubber composition | | | | |
| Applied compounding recipe No. | 3 | 2 | — | 5 |
| oxygen index | 23.5 | 21.5 | — | 23.5 |
| Ordinary rubber composition | | | | |
| Applied compounding recipe No. | 4 | 4 | 1 and 4 | 1 |
| oxygen index | 19.2 | 19.2 | 19.2 | 19.2 |
| Wear resistance of specimen | 95 | 98 | 100 | 100 |
| Crack resistance of specimen | 97 | 99 | 100 | 95 |
| Tire burning test | self-extinguish immediately | self-extinguish after 3 minutes | burn out | burn out |
| Wear resistance of tire | 99 | 100 | 100 | 100 |
| Tire durability | no trouble | no trouble | no trouble | no trouble |

EXAMPLES 3 TO 5

In these examples, there are provided flame-retardant rubber tires having a tire size of 13/80R20 and a basic structure as shown in FIGS. 2 and 3. Moreover, the reinforcing portion inside the outer rubber body portion is the same as in Example 1.

In the rubber tire of Example 3, the outer rubber body portion comprises the tread rubber layer 2, the sidewall rubber layer 3 and the rubber chafer layer 12 as shown in FIG. 2. The tread rubber layer 2 is a layer $L_1$ of a flame-retardant rubber composition and the sidewall rubber layer is a layer $L_2$ of a flame-retardant rubber composition different from the layer $L_1$, while the rubber chafer layer 12 is formed by an ordinary rubber composition. The total weight of the layers $L_1$ and $L_2$ is 21 kg, while the weight of the rubber tire 20 is 65 kg.

In the rubber tire of Example 4, the tread rubber layer 2, sidewall rubber layer 3 and rubber chafer layer 12 of the outer rubber body portion are layers $L_1$, $L_2$ and $L_3$ of flame-retardant rubber composition as shown in FIG. 3. The total weight of the layers $L_1$, $L_2$ and $L_3$ is 22 kg.

In the rubber tire of Example 5, the outer rubber body portion is the same as in Example 3 except that only a part of the tread rubber layer 2 is a layer $L_1$ of a flame-retardant rubber composition. The weight of the layer $l_1$ is 17 kg.

In the rubber tire of Comparative Example 2, only the outer surface portion of the sidewall rubber layer 3 is formed by 4 kg of a flame-retardant rubber composition.

A compounding recipe of rubber layers used in Examples 3 to 5 and the control and Comparative Example 2 is shown in Table 3. In this case, the numerical value of the additive is represented as part by weight based on 100 parts parts by weight of rubber ingredient according to usual manner. In Table 4 are shown compounding recipe No. applied to the outer rubber body portion and its oxygen index as well as the weight ratio of flame-retardant rubber composition to the outer rubber body portion.

The flame retardance is evaluated with respect to these rubber tires in the same manner as in Example 1 to obtain results as shown in Table 4. The rubber tires of Examples 3 to 5 exhibit excellent flame retardance because they ignite after about 0.5 minute but the burning is extinguished immediately and in about 5 minutes after the stop of the heating. On the other hand, the rubber tires in the control and Comparative Example 1 are burnt out after the termination of heating.

Furthermore, the wear resistance and crack resistance of the rubber tire are evaluated by actually running the vehicle, and also the separation resistance is evaluated by running on a drum testing machine for a given time. The results are also shown in Table 4. The wear resistance and crack resistance are represented by an index on the basis that the control is 100, in which the larger the index value, the better the property. The rubber tires of these examples are equal to or practically ignorable as compared with the control.

TABLE 3

| | Tread rubber layer | | | Sidewall rubber layer | | | Rubber chafer layer | |
|---|---|---|---|---|---|---|---|---|
| | Compounding recipe No. | | | | | | | |
| | 1 | 2 | 3 | 4 | 5 | 6 | 7 | 8 |
| natural rubber | 70.0 | 70.0 | 70.0 | 50.0 | 50.0 | 50.0 | 50.0 | 50.0 |
| polybutadiene rubber | 30.0 | 30.0 | 30.0 | 50.0 | 50.0 | 50.0 | 50.0 | 50.0 |
| carbon black | 45.0 | 45.0 | 45.0 | 40.0 | 40.0 | 40.0 | 70.0 | 70.0 |
| stearic acid | 2.0 | 2.0 | 2.0 | 2.0 | 2.0 | 2.0 | 2.0 | 2.0 |
| zinc white | 4.0 | 4.0 | 4.0 | 3.0 | 3.0 | 3.0 | 5.0 | 5.0 |
| sulfur | 1.5 | 1.5 | 1.5 | 2.0 | 2.0 | 2.0 | 2.0 | 2.0 |
| vulcanization accelerator | 0.85 | 0.85 | 0.85 | 0.5 | 0.5 | 0.5 | 1.0 | 1.0 |
| antioxidant | 1.4 | 1.4 | 1.4 | 1.6 | 1.6 | 1.6 | 2.5 | 2.5 |
| chlorinated paraffin | 0.0 | 6.0 | 18.0 | 0.0 | 6.2 | 19.0 | 0.0 | 5.8 |
| antimony trioxide | 0.0 | 0.9 | 2.7 | 0.0 | 1.0 | 2.9 | 0.0 | 0.8 |
| aluminum hydroxide | 0.0 | 4.5 | 13.5 | 0.0 | 4.7 | 14.5 | 0.0 | 4.3 |
| oxygen index | 19.2 | 20.5 | 23.5 | 19.2 | 20.5 | 23.5 | 19.2 | 20.5 |

TABLE 4

| | Example 3 | Example 4 | Example 5 | Control | Comparative Example 2 |
|---|---|---|---|---|---|
| Flame-retardant rubber composition | | | | | |
| Applied compounding recipe No. | 3, 6 | 2, 5, 8 | 2 | — | 6 |
| oxygen index | 23.5 | 20.5 | 20.5 | — | 23.5 |
| Ordinary rubber composition No. | | | | | |
| Applied compounding recipe No. | 7 | — | 1 | 1, 4, 7 | 7 |
| oxygen index | 19.2 | — | 19.2 | 19.2 | 19.2 |
| Weight ratio of flame-retardant rubber composition in outer rubber body portion (%) | 94 | 100 | 42 | 0 | 25 |
| Tire burning test | self-extinguish immediately | self-extinguish immediately | self-extinguish after 5 minutes | burn out | burn out |
| Wear resistance (index) | 95 | 98 | 98 | 100 | 100 |
| Crack resistance (index) | 97 | 99 | 100 | 100 | 95 |
| Durability (separation) | no trouble | no trouble | no trouble | no trouble | no trouble |

EXAMPLES 6 TO 10

In these examples, there are provided flame-retardant rubber tires having a tire size of 13/80R20 and the same basic structure as shown in FIG. 1 except that a shoulder portion in the tread rubber layer 2 is a layer HL of a higher flame-retardant rubber composition as compared with a layer L of a flame-retardant rubber composition as a tread cap rubber layer as shown in FIGS. 4 and 5. Moreover, the reinforcing portion inside the outer rubber body portion is the same as in Example 1.

In these rubber tires, the oxygen index of the tread cap rubber layer L is 21.0, and the higher flame-retardant rubber layer HL in the shoulder portion is formed according to the following compounding recipe and has an oxygen index of 26.5.

|  | (parts by weight) |
| --- | --- |
| natural rubber (NR) | 50.0 |
| butadiene rubber (BR) | 50.0 |
| carbon black ISAF | 40.0 |
| stearic acid | 2.0 |
| zinc white | 3.0 |
| sulfur | 2.0 |
| vulcanization accelerator | 0.5 |
| antioxidant | 1.6 |
| chlorinated paraffin | 28.5 |
| antimony trioxide | 5.0 |
| aluminum hydroxide | 22.0 |

In the rubber tire of Example 6, the higher flame-retardant rubber layer HL has a shape shown in FIG. 4, in which a surface distance $W_1$ inward in radial direction is 7 mm, a surface distance inward in radial direction is 10 mm and a thickness t is about 6 mm.

In the rubber tire of Example 7, the higher flame-retardant rubber layer HL has a shape shown in FIG. 5, in which a surface distance $W_1$ inward in radial direction is 7 mm, a surface distance inward in radial direction is 10 mm and a thickness t is 5 mm.

In the rubber tire of Example 8, the higher flame-retardant rubber layer HL has a shape shown in FIG. 5, in which a surface distance $W_1$ inward in radial direction is 2 mm, a surface distance inward in radial direction is 2 mm and a thickness t is 1.5 mm.

In the rubber tire of Example 9, the higher flame-retardant rubber layer HL has a shape shown in FIG. 5, in which a surface distance $W_1$ inward in radial direction is 7 mm, a surface distance inward in radial direction is 25 mm and a thickness t is 7 mm.

In the rubber tire of Example 10, the higher flame-retardant rubber layer HL has a shape shown in FIG. 5, in which a surface distance $W_1$ inward in radial direction is 7 mm, a surface distance inward in radial direction is 10 mm and a thickness t is 7 mm.

The flame retardance and resistance to uneven wear are evaluated with respect to these rubber tires to obtain results as shown in Table 5. Moreover, the burning test of the rubber tire is carried out in the same manner as in Example 1.

EXAMPLES 11 TO 17, COMPARATIVE EXAMPLE 3

The flame-retardant rubber tire of Example 11 has a tire size of 13/80R20 and the same basic structure as in Example 1 except that 75% by weight of the tread rubber layer 2 is a layer of a flame-retardant rubber composition having a compounding recipe No. 2 shown in Table 1. The remaining portion of the tread rubber layer 2 is composed of the ordinary rubber composition having the compounding recipe No. 1 shown in Table 1, and the sidewall rubber layer is composed of the ordinary rubber composition having the compounding recipe No. 4 shown in Table 1. Furthermore, four main circumferential grooves 16 are formed in the ground contact surface of the tread rubber layer 2 and extend zigzag in the circumferential direction of the tire as shown in FIG. 7. Each of these main circumferential grooves 16 has no see-through portion in groove space, in which a line connecting convex portions of the opposed sidewalls to each other is coincident at the opposed sidewalls (phantom line A in FIG. 7).

In the main circumferential groove 16, an amplitude H of groove center line is 8 mm, and a pitch P is 19.6 mm, and a groove width $W_3$ is 8 mm, and a groove depth $D_1$ is 8 mm (FIG. 6). Further, the sidewalls of the main circumferential groove 16 at a bent portion 16A are smoothly connected to each other at a radius of curvature (R) of 10 mm. Moreover, a fine groove 17 having a groove width $W_4$ is arranged at each side of the main circumferential groove 16 in parallel therewith at a distance of 5 mm apart therefrom. The groove depth $D_2$ of the fine groove 17 is 8 mm (FIG. 6).

These main circumferential grooves 16 and fine grooves 17 are formed in the flame-retardant rubber layer, so that the ordinary rubber layer is not exposed from the groove bottoms.

The rubber tire of Example 12 is the same as in Example 11 except that the main circumferential groove 16 is comprised of a combination of a straight portion 18 extending in the circumferential direction and a slant portion 19 connecting to the straight portion 18 and inclined with respect to the circumferential direction as shown in FIG. 8. In this case, the straight portions 18 are alternately shifted to each other in the widthwise direction of the tire, and the main circumferential groove 16 extends zigzag in the circumferential direction of the tire as a whole, in which a line connecting convex portions of the opposed sidewalls to each other is coincident at the opposed sidewalls (phantom line in FIG. 8). Furthermore, the sidewalls of the straight portion 18 and the slant portion 19 are smoothly connected to each other at a radius of curvature (R) of 10 mm in the bent portion 16A of the main circumferential

TABLE 5

|  | Example 6 | Example 7 | Example 8 | Example 9 | Example 10 |
| --- | --- | --- | --- | --- | --- |
| Oxygen index of tread cap rubber layer L | 21.0 | 21.0 | 21.0 | 21.0 | 21.0 |
| Oxygen index of higher flame-retardant rubber layer HL | 26.5 | 26.5 | 26.5 | 26.5 | 26.5 |
| $W_1$ of layer HL (mm) | 7 | 7 | 2 | 7 | 7 |
| $W_2$ of layer HL (mm) | 10 | 10 | 2 | 25 | 10 |
| t of layer HL (mm) | 6 | 5 | 1.5 | 3.0 | 8 |
| Tire burning test | self-extinguish after 3 minutes | self-extinguish after 3 minutes | self-extinguish after 5 minutes | self-extinguish after 2 minutes | self-extinguish after 1.5 minutes |
| Resistance to uneven wear | no trouble | no trouble | no trouble | no trouble | trouble occurs | groove 16. Moreover, the amplitude H, pitch P, width $W_3$ and depth $D_1$ are the same as in Example 11.

The rubber tire of Example 13 is the same as in Example 11 except that the fine grooves 17 are removed from the tread pattern shown in FIGS. 6 and 7.

The rubber tire of Example 14 is the same as in Example 11 except that the bent portion 16A of the main circumferential groove 16 forms a sharp corner in the tread pattern shown in FIGS. 6 and 7.

wear is evaluated by a step worn difference in the vicinity of the main circumferential groove, and the crack resistance is evaluated by number of cracks produced and depth and length of the crack. These properties are represented by an index on the basis that the control is 100, in which the larger the index value, the better the wear resistance, and the smaller the index value, the better the resistance to uneven wear and crack resistance.

TABLE 6

|  | Example 11 | Example 12 | Example 13 | Example 14 | Example 15 | Example 16 | Example 17 | Control | Comparative Example 3 |
| --- | --- | --- | --- | --- | --- | --- | --- | --- | --- |
| Oxygen index of tread rubber layer | 21.5 | 21.5 | 21.5 | 21.5 | 21.5 | 21.5 | 21.5 | 19.2 | 19.2 |
| Presence of see-through portion in groove | none | none | none | none | none | presence | presence | presence | none |
| Bent shape of groove sidewall (unit: mm) | arc radius of curvature: 10R | arc radius of curvature: 10R | arc radius of curvature: 10R | sharp | sharp | arc radius of curvature: 10R | sharp | sharp | arc radius of curvature: 10R |
| Presence of fine groove | presence | presence | none | presence | none | none | none | none | none |
| Burning test of tire | self-extinguish after 20 seconds | self-extinguish after 35 seconds | self-extinguish after 20 seconds | self-extinguish after 40 seconds | self-extinguish after 40 seconds | self-extinguish after 60 seconds | self-extinguish after 90 seconds | burn out after 50 minutes | burn out after 40 minutes |
| Wear resistance | 100 | 100 | 98 | 100 | 97 | 98 | 98 | 100 | 100 |
| Resistance to uneven wear | 170 | 180 | 97 | 150 | 95 | 100 | 98 | 100 | 98 |
| Crack resistance | 100 | 100 | 99 | 100 | 99 | 100 | 99 | 100 | 100 |

The rubber tire of Example 15 is the same as in Example 11 except that the bent portion 16A of the main circumferential groove 16 forms a sharp corner and the fine grooves 17 are removed from the tread pattern shown in FIGS. 6 and 7.

The rubber tire of Example 16 is the same as in Example 11 except that the tread has a pattern shown in FIG. 10, in which a main circumferential groove 120 has a see-through portion having a width of 5.5 mm extending in the circumferential direction (shadowed portion in FIG. 10) and extends zigzag in the circumferential direction at an amplitude H of 2.5 mm and smoothly connects its sidewalls to each other at a radius of curvature (R) of 10 mm.

The rubber tire of Example 17 is the same as in Example 16 except that the bent portion 120A of the main circumferential groove 120 forms a sharp corner (FIG. 10).

The rubber tire of Comparative Example 3 is the same as in Example 13 except that the tread rubber layer 2 is comprised of the ordinary rubber composition having a compounding recipe No. 1 shown in Table 1 as a whole.

The rubber tire of the control is the same as in Example 17 except that the tread rubber layer 2 is comprised of the ordinary rubber composition having a compounding recipe No. 1 shown in Table 1 as a whole.

The flame retardance is evaluated with respect to these rubber tires to obtain results as shown in Table 6. Moreover, the burning test of the rubber tire was carried out in the same manner as in Example 1.

Further, the wear resistance, resistance to uneven wear and crack resistance are measured by mounting each of these rubber tires on a driving shaft of a vehicle and actually running under a normal load over a distance of 50,000 km to obtain results as shown in Table 6. The wear resistance is evaluated by a ratio of running distance/worn amount, and the resistance to uneven In these examples, the amount of the flame retardant used is controlled to minimum by forming the sidewall rubber layer with the ordinary rubber composition, but the sidewall rubber layer may be made from the flame-retardant rubber composition. Furthermore, lateral grooves and subsidiary groove having a width narrower than that of the main circumferential groove and extending circumferentially of the tire may be formed in the above tread pattern.

EXAMPLES 18 TO 20, COMPARATIVE EXAMPLES 4 AND 5

In these examples, there are provided flame-retardant rubber tires having a tire size of 13/80R20 and a basic structure as shown in FIG. 11. Moreover, the reinforcing portion inside the outer rubber body portion is the same as in Example 1.

In these rubber tires, the outer rubber body portion is comprised of tread rubber layer and sidewall rubber layer each having a compounding recipe as shown in Table 7 and rubber properties as shown in Table 8. Moreover, the surface area and weight of the outer rubber body portion are 23000 $cm^2$ and 22 kg, respectively.

The flame retardance is evaluated with respect to these rubber tires to obtain results as shown in Table 8. Moreover, the burning test of the rubber tire is carried out in the same manner as in Example 1. Furthermore, the wear resistance and crack resistance of the rubber tire are evaluated by actually running the vehicle, and also the separation resistance is evaluated by running on a drum testing machine. The results are also shown in Table 8. The properties are represented by an index on the basis that the control is 100, in which the larger the index value, the better the property. The rubber tires of these examples are equal to or practically ignorable as compared with the control.

TABLE 7

|  | Example 18 | | Example 19 | | Example 20 | | Comparative Example 4 | | Comparative Example 5 | | Control | |
| --- | --- | --- | --- | --- | --- | --- | --- | --- | --- | --- | --- | --- |
|  | tread rubber layer | sidewall rubber layer | tread rubber layer | sidewall rubber layer | tread rubber layer | sidewall rubber layer | tread rubber layer | sidewall rubber layer | tread rubber layer | sidewall rubber layer | tread rubber layer | sidewall rubber layer |
| Natural rubber | 70.0 | 50.0 | 70.0 | 50.0 | 70.0 | 50.0 | 70.0 | 50.0 | 70.0 | 50.0 | 70.0 | 50.0 |
| Polybutadiene rubber | 30.0 | 50.0 | 30.0 | 50.0 | 30.0 | 50.0 | 30.0 | 50.0 | 30.0 | 50.0 | 30.0 | 50.0 |
| Carbon black | 45.0 | 40.0 | 45.0 | 40.0 | 45.0 | 40.0 | 45.0 | 40.0 | 45.0 | 40.0 | 45.0 | 40.0 |
| Stearic acid | 2.0 | 2.0 | 2.0 | 2.0 | 2.0 | 2.0 | 2.0 | 2.0 | 2.0 | 2.0 | 2.0 | 2.0 |
| Zinc white | 4.0 | 3.0 | 4.0 | 3.0 | 4.0 | 3.0 | 4.0 | 3.0 | 4.0 | 3.0 | 4.0 | 3.0 |
| Sulfur | 1.5 | 2.0 | 1.5 | 2.0 | 1.5 | 2.0 | 1.5 | 2.0 | 1.5 | 2.0 | 1.5 | 2.0 |
| Vulcanization accelerator | 0.85 | 0.5 | 0.85 | 0.5 | 0.85 | 0.5 | 0.85 | 0.5 | 0.85 | 0.5 | 0.85 | 0.5 |
| Antioxidant | 1.4 | 1.6 | 1.4 | 1.6 | 1.4 | 1.6 | 1.4 | 1.6 | 1.4 | 1.6 | 1.4 | 1.6 |
| Chlorinated paraffin | 6.00 | 6.20 | 18.0 | 0.00 | 6.00 | 0.00 | 0.00 | 18.00 | 18.0 | 0.00 | 0.00 | 0.00 |
| Antimony trioxide | 0.90 | 1.00 | 2.70 | 0.00 | 0.90 | 0.00 | 0.00 | 2.70 | 2.7 | 0.00 | 0.00 | 0.00 |
| Aluminum hydroxide | 4.50 | 4.70 | 13.5 | 0.00 | 4.50 | 0.00 | 0.00 | 13.5 | 13.5 | 0.00 | 0.00 | 0.00 |
| Oxygen index (O.I.) | 20.5 | 20.5 | 23.5 | 19.2 | 20.5 | 19.2 | 19.2 | 23.5 | 23.5 | 19.2 | 19.2 | 19.2 |

Note) parts by weight of additives based on 100 parts by weight of rubber ingredient

TABLE 8

|  |  | Example 18 | Example 19 | Example 20 | Control | Comparative Example 4 | Comparative Example 5 |
| --- | --- | --- | --- | --- | --- | --- | --- |
| Tread rubber layer | O.I. | 20.5 | 23.5 | 20.5 | 19.2 | 19.2 | 23.5 |
|  | S | 0.36 | 0.36 | 0.36 | 0.0 | 0.0 | 0.36 |
|  | V (kg) | 17 | 17 | 17 | 0.0 | 0.0 | 5 |
|  | U | 0.77 | 0.77 | 0.77 | 0.0 | 0.0 | 0.23 |
| Sidewall rubber layer | O.I. | 20.5 | 19.2 | 19.2 | 19.2 | 23.5 | 19.2 |
|  | S | 0.58 | 0.0 | 0.0 | 0.0 | 0.58 | 0.0 |
|  | V (kg) | 4.0 | 0.0 | 0.0 | 0.0 | 4.0 | 0.0 |
|  | U | 0.18 | 0.0 | 0.0 | 0.0 | 0.18 | 0.0 |
| Flame retardance |  | 105 | 111 | 97 | 0.0 | 9.8 | 9.7 |
| Burning test of tire |  | self-extinguish immediately | self-extinguish immediately | self-extinguish after 5 minutes | burn out | burn out | burn out |
| Tire performances (index) | wear resistance | 98 | 95 | 98 | 100 | 100 | 95 |
|  | crack resistance | 99 | 100 | 100 | 100 | 95 | 100 |
|  | separation resistance | 97 | 94 | 98 | 100 | 98 | 97 |

Although all of the above examples are described with respect to the rubber tire reinforced with steel cords, the invention may be applied to not only radial rubber tires using inorganic or organic fiber cords but also bias rubber tires reinforced with these fiber cords as well as puncture-preventive rubber tires filled with urethane rubber or other rubber.

As mentioned above, the invention can provide flame-retardant rubber tires having very excellent self-extinguishing property and flame-delaying property even when being subjected to high-temperature fire source having a large heat capacity without damaging basic performances required in the rubber tire for use in electric vehicles, automobiles, airplanes and the like such as wear resistance, separation resistance, crack resistance and the like.

What is claimed is:

1. A flame-retardant rubber tires comprising: an outer rubber body portion consisting essentially of a tread rubber layer, a sidewall rubber layer extending inward from each side edge of the tread rubber layer toward the vicinity of a bead portion in radial direction and a rubber chafer layer arranged in the vicinity of the bead portion, and a reinforcing body located inside the outer rubber body portion, at least a portion of the outer rubber body portion comprised of one or more flame-retardant rubber layers having an oxygen index (O.I.) in the range of 19.8 to 27.5, and an absolute value of total (O.I.) $\times S \times V \times U$ values of the flame-retardant rubber layers is not less than 10 as a flame retardance when S is a ratio of surface area of the flame-retardant rubber layer to a full surface area of the outer rubber body portion, V (kg) is a weight of the flame-retardant rubber layer and U is a ratio of weight (kg) of the flame-retardant rubber layer to total weight (kg) of the outer rubber body portion.

2. The flame-retardant rubber tire according to claim 1, wherein said surface area ratio S of flame-retardant rubber layer to a full surface area of said outer rubber body portion exposed after the mounting onto a normal rim is at least 0.30 and said ratio U of weight of said flame-retardant rubber layer to total weight of said outer rubber body portion is not less than 0.40.

* * * * *